Oct. 22, 1935.                D. C. HOFFMANN                2,018,495
                          AUTOMATIC SWITCHING SYSTEM
                             Filed Sept. 1, 1934
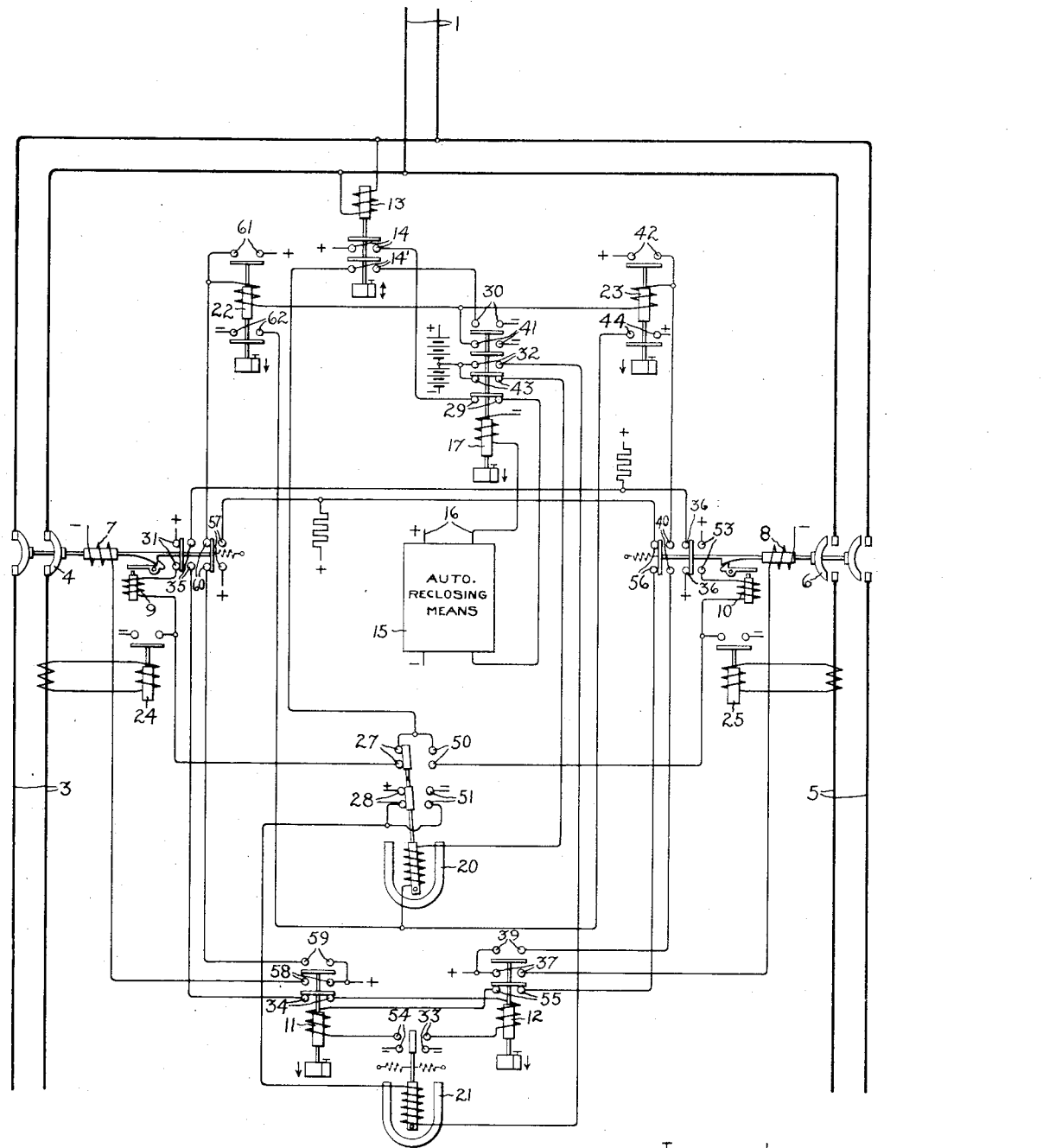
Inventor:
Daniel C. Hoffmann,
by Harry E. Dunham
His Attorney.

Patented Oct. 22, 1935

2,018,495

UNITED STATES PATENT OFFICE 2,018,495

AUTOMATIC SWITCHING SYSTEM

Daniel C. Hoffmann, Philadelphia, Pa., assignor to General Electric Company, a corporation of New York Application September 1, 1934, Serial No. 742,371

10 Claims. (Cl. 171—97)

My invention relates to automatic switching systems and particularly to systems for controlling the connections between a plurality of supply circuits and a common load cicuit so that when the load circuit voltage decreases below a predetermined sub-normal value, the load circuit is successively connected to the supply circuits, irrespective of whether or not the supply circuits are energized, until either a connection is established which restores the load circuit voltage to normal, or a predetermined number of connections have been effected. One object of my invention is to provide an improved automatic switching system for accomplishing such a result.

My invention will be better understood from the following description when taken in connection with the accompanying drawing, and its scope will be pointed out in the appended claims.

In the accompanying drawing, which is a diagram of an automatic switching system for controlling the connections between a load circuit and two supply circuits, 1 represents a load circuit which is arranged to be connected to a supply circuit 3 by means of a circuit breaker 4 and to a supply circuit 5 by means of a circuit breaker 6. In order to simplify the disclosure, I have shown my invention in connection with single phase circuits, but it will be obvious to those skilled in the art that it is as applicable to polyphase circuits.

The circuit breakers 4 and 6 may be of any suitable type, examples of which are well known in the art, and as shown in the drawing they are of the well known latched-in type and are provided respectively with the closing coils 7 and 8 and with the trip coils 9 and 10. The circuits of the closing coils 7 and 8 are controlled respectively by relays 11 and 12 which are of the well known hesitating control type.

In order to initiate the alternate closing of the circuit breakers 4 and 6 in response to a failure of the load circuit voltage, a low voltage relay 13 is provided which is arranged in any suitable manner so that it closes its contacts 14 and 14' when the load circuit voltage remains below a predetermined subnormal value for a predetermined time and opens these contacts when the load circuit voltage is normal. The closing of contacts 14 is arranged to initiate the operation of suitable automatic reclosing means 15 which effects the energization of a closing circuit 16 including the operating winding of a relay 17 a plurality of times with predetermined time intervals between successive energizations of the closing circuit. Since such automatic reclosing means are well known in the art and the detail circuits thereof form no part of my present invention, I have deemed it advisable, in order to simplify the disclosure, to represent such automatic reclosing means by a rectangle 15. Anderson et al. Patent 1,968,629, granted July 31, 1934, and assigned to the assignee of this application, discloses the details of an automatic reclosing arrangement which may be used in connection with my invention to effect the first energization of the closing circuit 16 substantially instantaneously after the load circuit voltage fails and for effecting a predetermined number of successive energizations of said closing circuits with relatively long predetermined time intervals between successive energizations if normal load circuit voltage is not restored within a predetermined time interval.

The relay 17, when energized, completes an energizing circuit for the trip coil of the last closed circuit breaker, if it is still closed, and an energizing circuit for the hesitating control relay of the other circuit breaker to effect the closing thereof as soon as both circuit breakers are simultaneously open. The selection of the proper trip and closing coils to be energized in response to successive energizations of the relay 17 is determined by the two position relay 20 which is of the well known polarized type that maintains its movable member in whichever of its two positions it is last moved, when the operating coil thereof is deenergized. The circuit of the operating winding of relay 20 is interlocked with the relay 17 and the circuit breakers 4 and 6 so that after the relay 17 has effected the closing of a circuit breaker, the winding of the relay 20 is energized in the proper manner to cause this relay to reverse its position and thereby prepare a circuit whereby the next energization of the relay 17 effects the opening of the last closed circuit breaker and the subsequent closing of the other circuit breaker. This interlocking means includes the relays 22 and 23, which are respectively controlled by the circuit breakers 4 and 6 when they are in their closed position and the relay 17 is in its energized position, and also includes a polarized relay 21 which is controlled by the polarized relay 20 and the relay 17 so as to close the circuit for the proper hesitating control relay in response to each energization of the relay 17.

In order to effect the opening of each circuit breaker in response to an overload on the load circuit, suitable overcurrent relays 24 and 25 may be provided for effecting the opening of the circuit breakers 4 and 6 respectively. These overcurrent relays 24 and 25 are connected in any suitable manner so they are respectively energized in accordance with the current supplied by the supply circuits 3 and 5 to the load current 1.

The operation of the arrangement shown in the drawing is as follows: When one of the circuit breakers is closed and normal voltage exists on the load circuit 1, the voltage relay 13 is energized so that its contacts 14 and 14' are open. For the purpose of this description, it will be assumed that the circuit breaker 4 is closed so that the supply circuit 3 is supplying current to the load circuit 1. Under such conditions the relay 20 is in the position shown so that its contacts 27 and 28 are closed and the other control devices occupy the positions they are shown as occupying in the drawing.

It will now be assumed that the supply circuit 3 fails so that the voltage of the load circuit decreases below a predetermined value and causes the relay 13 to close its contacts 14 and 14'. The closing of the contacts 14 completes through the normally closed contacts 29 of the relay 17, a starting circuit for the automatic reclosing means 15 which, if the load circuit voltage is not restored to normal within a predetermined value, effects the successive energization of the closing circuit 16 and relay 17 a predetermined number of times with predetermined time intervals between successive energizations. The time intervals between successive energizations will depend upon the setting of the automatic reclosing means.

In response to the initial energization of the closing circuit 16 and relay 17, a circuit is completed for the trip coil 9 of circuit breaker 4 through contacts 30 of relay 17, contacts 14' of relay 13, contacts 27 of relay 20, and auxiliary contacts 31 on circuit breaker 4, if this circuit breaker is closed. Also a circuit is completed through contacts 32 of relay 17 and contacts 28 of relay 20 for the operating winding of relay 21 so that current flows through this operating winding in the proper direction to cause the relay 21 to close its contacts 33. As soon as the circuit breaker 4 opens, a circuit is completed for the hesitating control relay 12 through contacts 33 of relay 21, contacts 34 of relay 11, auxiliary contacts 35 on circuit breaker 4 and auxiliary contacts 36 on circuit breaker 6. Relay 12 by closing its contacts 37 completes an energizing circuit for the closing coil 8 of circuit breaker 6 to effect the closing thereof.

Although the relay 17, when energized, interrupts the contacts 29 in the starting circuit for the automatic reclosing means 15 and thereby effects in a well known manner the immediate opening of the closing circuit 16, the relay 17 is designed in any suitable manner so that it remains in its energized position for a predetermined time after the operating coil thereof is deenergized so as to insure that the circuit breaker, whose closing is being effected, closes.

As soon as the circuit breaker 6 closes, a circuit is completed through auxiliary contacts 40 on circuit breaker 6 and contacts 41 of relay 17 for the operating winding of the relay 23. By closing its contacts 42, relay 23 completes a locking circuit for itself so that it remains energized until the relay 17 is restored to its normal position after the circuit breaker 6 closes, at which time the circuit of relay 23 is interrupted at contacts 41 of relay 17. The relay 23, however, is designed in any suitable manner so that it remains in its energized position for a predetermined time after its winding is deenergized. Therefore, when the relay 17 is restored to its normal position and closes its contacts 43, after the circuit breaker 6 closes, a circuit is completed for a predetermined time through contacts 44 of relay 23 for the operating winding of relay 20 so that current flows through this operating winding in the proper direction to cause the relay 20 to open its contacts 27 and 28 and close its contacts 50 and 51. In this manner the circuits which are completed by the closing of the contacts 30 and 32 of relay 17 are transferred so that the next energization of the relay 17 effects the energization of the trip coil 10 of the circuit breaker 6 and the energization of the closing coil 7 of the circuit breaker 4.

If the supply circuit 5 is energized so that the closing of the circuit breaker 6 restores the voltage of the load circuit 1 to normal, the relay 13 will open its contacts 14 and 14' and thereby open the starting circuit of the automatic reclosing means so that it does not effect any further energizations of the closing circuit 16 and relay 17. The automatic reclosing means 15 then restores itself to its normal condition in a manner well known in the art.

If, however, the supply circuit 5 is not energized and therefore the voltage of the load circuit 1 is not restored to normal by the closing of the circuit breaker 6, the automatic reclosing means 15 effects another energization of the closing circuit 16 and relay 17 a predetermined time after the initial energization thereof. The closing of the contacts 30 of the relay 17 in response to this second energization thereof completes through contacts 14' of relay 13, contacts 50 of relay 20 and auxiliary contacts 53 on circuit breaker 6 an energizing circuit for the trip coil 10 to effect the opening of the circuit breaker 6. The closing of the contacts 32 of the relay 17, at this time, completes through contacts 51 of relay 20 an energizing circuit for the operating winding of relay 21 so that current flows through this operating winding in the proper direction to cause the relay 21 to close its contacts 54. As soon as the circuit breaker 6 opens, a circuit is completed for the hesitating control relay 11 through contacts 54 of relay 21, contacts 55 of relay 12, auxiliary contacts 56 on circuit breaker 6 and auxiliary contacts 57 on circuit breaker 4. Relay 11, by closing its contacts 58, completes an energizing circuit for the closing coil 7 of circuit breaker 4 to effect the closing thereof.

As soon as the circuit breaker 4 closes, a circuit is completed through auxiliary contacts 60 on circuit breaker 4, and contacts 41 of relay 17 for the relay 22. By closing its contacts 61, relay 22 completes a locking circuit for itself so that it remains energized until the relay 17 returns to its normal position. When this occurs, a circuit is completed for the operating winding of relay 20 through contacts 62 of relay 22 and contacts 43 of relay 17 before the relay 22 opens its contacts 62, which are arranged in any suitable manner so that they do not open until a predetermined time after the operating winding of the relay is deenergized. The current through this circuit for the operating winding of relay 20 is in the proper direction to cause the relay to open its contacts 50 and 51 and close its contacts 27 and 28 so that the next energization of the relay 17 effects the opening of the circuit breaker 4 and the closing of the circuit breaker 6.

Therefore, with the arrangement shown in the drawing, the circuit breakers 4 and 6 are alternately closed until either the load circuit voltage is restored to normal or the automatic reclosing means 15 has effected a predetermined number of energizations of the closing circuit 16, after which the reclosing means is rendered inoperative, in a manner well known in the art, to effect further energizations thereof.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an electric circuit, a plurality of supply circuits, an individual circuit breaker for connecting each supply circuit to said electric circuit, a closing circuit, means responsive to a predetermined electrical condition of said electric circuit for energizing said closing circuit a plurality of times, a relay in said closing circuit, and means for effecting the closing of different circuit breakers in response to successive energizations of said relay.

2. In combination, a load circuit, two supply circuits, an individual circuit breaker for connecting each supply circuit to said load circuit, a closing circuit, means responsive to a load circuit voltage below a predetermined value for energizing said closing circuit a plurality of times with predetermined time intervals between successive energizations, a relay in said closing circuit, and means for causing successive energizations of said relay to effect the alternate closing of said circuit breakers.

3. In combination, a load circuit, two supply circuits, an individual circuit breaker for connecting each supply circuit to said load circuit, a closing circuit, means responsive to a load circuit voltage below a predetermined value for energizing said closing circuit a plurality of times with predetermined time intervals between successive energizations, means responsive to every other energization of said closing circuit for effecting the opening of one of said circuit breakers and the closing of the other circuit breaker, and means responsive to each of the remaining energizations of said closing circuit for effecting the opening of said other circuit breaker and the closing of said one of said circuit breakers.

4. In combination, two circuit breakers, a closing circuit, means for successively energizing said closing circuit, means responsive to each energization of said closing circuit for effecting the opening of the circuit breaker last closed if it is still closed and the closing of the other circuit breaker, and selective means controlled by the closing of each circuit breaker for rendering the next succeeding energization of said closing circuit operative to effect the opening of the circuit breaker last closed if it is still closed and the closing of the other circuit breaker.

5. In combination, a load circuit, two supply circuits, an individual circuit breaker for connecting each supply circuit to said load circuit, and means for effecting the alternate closing of said circuit breakers when the load circuit voltage is below a predetermined value including a closing circuit, means for successively energizing said closing circuit while the voltage of said load circuit remains below said predetermined value, means responsive to each energization of said closing circuit for effecting the opening of the circuit breaker last closed if it is still closed and the closing of the other circuit breaker, and selective means controlled by the closing of each circuit breaker for rendering the next succeeding energization of said closing circuit operative to effect the opening of the circuit breaker last closed and the closing of the other circuit breaker.

6. In combination, two circuit breakers, a closing circuit, means for successively energizing said closing circuit, means responsive to the first energization of said closing circuit for effecting the opening of one of said circuit breakers if it is closed and the closing of the other of said circuit breaker, means controlled by each closing of said other circuit breaker for rendering the next succeeding energization of said closing circuit operative to effect the opening of said other circuit breaker if it is closed and the closing of said one of said circuit breakers, and means responsive to each closing of said one of said circuit breakers for rendering the next succeeding energization of said closing circuit operative to effect the opening of said one of said circuit breakers and the closing of said other circuit breaker.

7. In combination, a load circuit, a supply circuit, a circuit breaker connecting said supply circuit to said load circuit, a second supply circuit, a second circuit breaker for connecting said second supply circuit to said load circuit, a closing circuit, means responsive to a predetermined abnormal electrical condition of said load circuit for successively energizing said closing circuit with predetermined time intervals between successive energizations, means responsive to the first energization of said closing circuit for effecting the opening of said first mentioned circuit breaker if it is closed and the closing of said second circuit breaker, means controlled by each closing of said second circuit breaker for rendering the next succeeding energization of said closing circuit operative to effect the opening of said second circuit breaker if it is closed and the closing of said first mentioned circuit breaker, and means responsive to each closing of said first mentioned circuit breaker for rendering the next succeeding energization of said closing circuit operative to effect the opening of said first mentioned circuit breaker if it is closed and the closing of said second circuit breaker.

8. In combination, two circuit breakers, a closing circuit, means for successively energizing said closing circuit, a two position device, means responsive to the energization of said closing circuit for effecting the opening of one of said circuit breakers and the closing of the other circuit breaker when said device is in one position and for effecting the opening of said other circuit breaker and the closing of said one of said circuit breakers when said device is in its other position, and means responsive to the closing of each circuit breaker for reversing the position of said device.

9. In combination, a load circuit, two supply circuits, an individual circuit breaker for connecting each supply circuit to said load circuit, a closing circuit, means responsive to a predetermined abnormal electrical condition of said load circuit for successively energizing said closing circuit a predetermined number of times, a two position device, means responsive to the energization of said closing circuit when said device is in one of the positions for effecting the opening of one of said circuit breakers and the closing of the other circuit breaker and when said device is in its other position for effecting the opening of said other circuit and the closing of said one of said circuit breakers, and means responsive to the closing of each circuit breaker for reversing the position of said two position device.

10. In combination, a load circuit, two supply circuits, an individual circuit breaker for connecting each supply circuit to said load circuit, a closing circuit, means responsive to a predetermined abnormal electrical condition of said load circuit for successively energizing said closing circuit a predetermined number of times, a two position polarized relay having an operating winding, means responsive to the energization of said closing circuit when said relay is in one of its positions for effecting the opening of one of said circuit breakers and the closing of the other circuit breaker and when said relay is in the other position for effecting the opening of said other circuit breaker and the closing of said one of said circuit breakers, and means responsive to the closing of each circuit breaker for completing an energizing circuit through said operating coil so that current flows therethrough in the proper direction to reverse the position of said relay.

DANIEL C. HOFFMANN.